United States Patent [19]
Richhart

[11] Patent Number: 5,487,317
[45] Date of Patent: Jan. 30, 1996

[54] VEHICLE PEDAL COVER FOR USE WITH AN AUXILIARY PEDAL DEVICE

[76] Inventor: Alvin D. Richhart, 805 Jackson St., Sterling, Colo. 80751

[21] Appl. No.: 180,075

[22] Filed: Jan. 11, 1994

[51] Int. Cl.⁶ .................... G05G 1/16; G05G 1/18
[52] U.S. Cl. .................... 74/562.5; 74/564
[58] Field of Search .................... 74/513, 526, 562.5, 74/562, 563, 478.5, 564

[56] References Cited

U.S. PATENT DOCUMENTS

| | | | |
|---|---|---|---|
| 2,625,051 | 1/1953 | Kriseman | 74/526 X |
| 2,841,033 | 7/1958 | Fields | 74/526 |
| 3,108,489 | 10/1963 | Self. | |
| 3,181,666 | 5/1965 | Dow | 74/513 X |
| 3,199,369 | 8/1965 | Kaul. | |
| 3,224,293 | 12/1965 | Rose. | |
| 3,543,606 | 12/1970 | Kaul. | |
| 4,587,865 | 5/1986 | Winner. | |
| 5,063,811 | 11/1991 | Smith et al. | 74/513 |
| 5,168,771 | 12/1992 | Fujimori. | |

FOREIGN PATENT DOCUMENTS

| | | |
|---|---|---|
| 490383 | 2/1953 | Canada. |
| 1269300 | 7/1961 | France. |
| 1170255 | 5/1964 | Germany. |

*Primary Examiner*—Rodney H. Bonck
*Assistant Examiner*—Mary Ann Battista
*Attorney, Agent, or Firm*—Richard C. Litman

[57] ABSTRACT

A vehicle pedal cover for use in conjunction with an auxiliary pedal device positioned on either side of the pedal to be covered. It includes an upper plate securable at a predetermined distance above the vehicle pedal. This predetermined distance is adjustable to permit use of the vehicle pedal cover in vehicles of all sizes and shapes. Additionally, the upper plate may be rotated out of its blocking position to allow unhindered use of the vehicle pedal. The upper plate is attachable to the auxiliary pedal device so that moving the auxiliary pedal into its working position automatically moves the upper plate into its pedal blocking position.

8 Claims, 2 Drawing Sheets

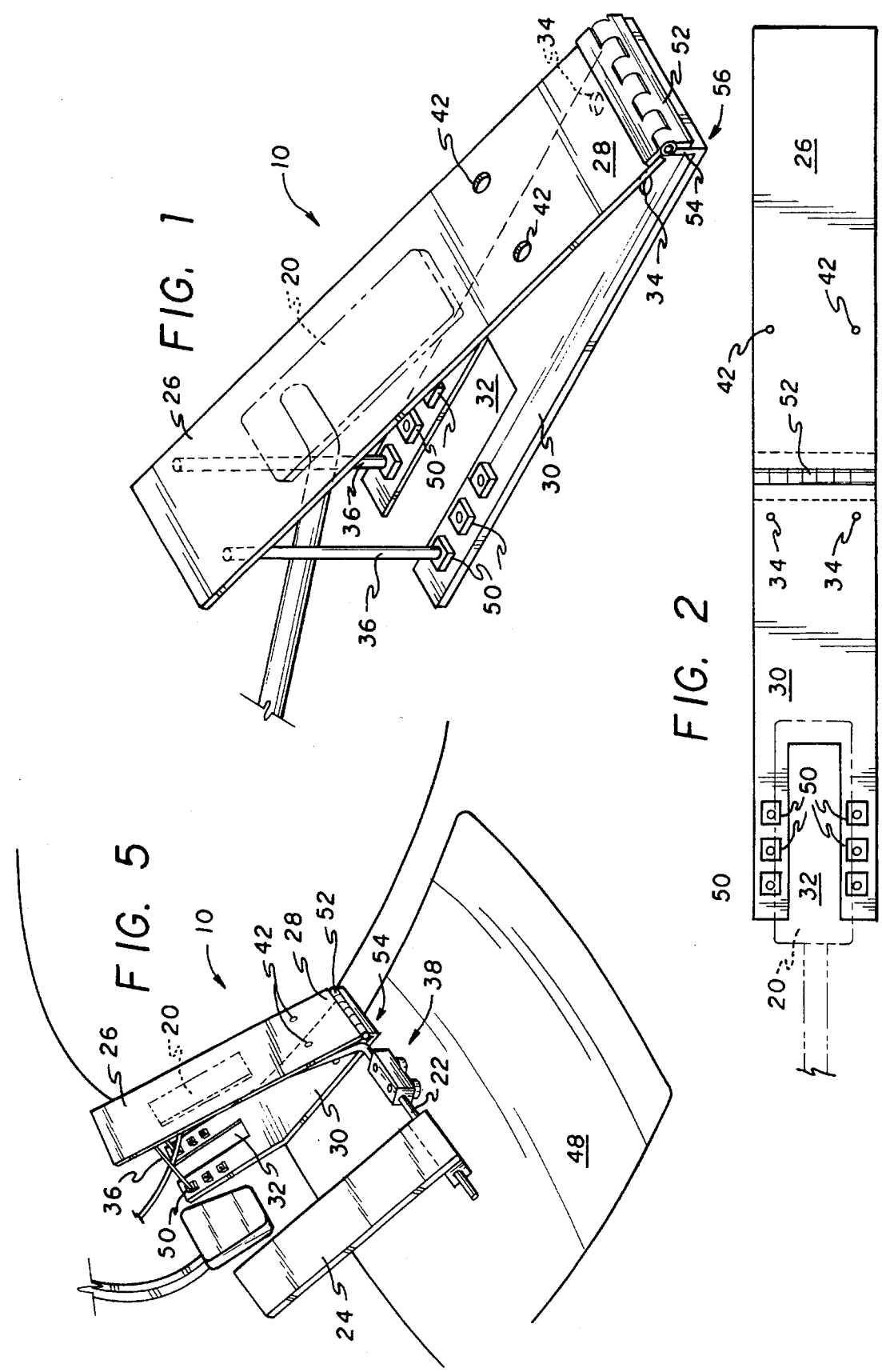

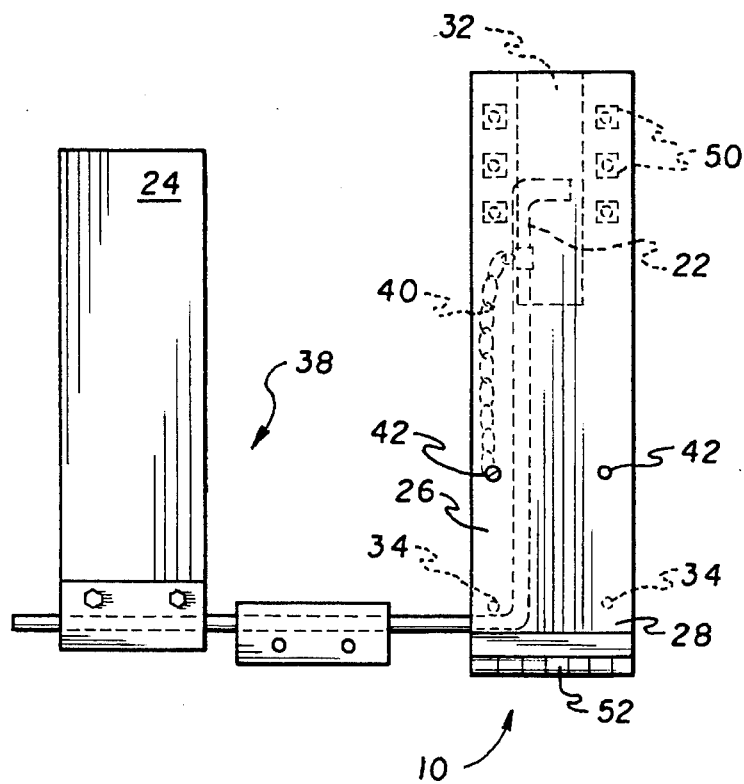
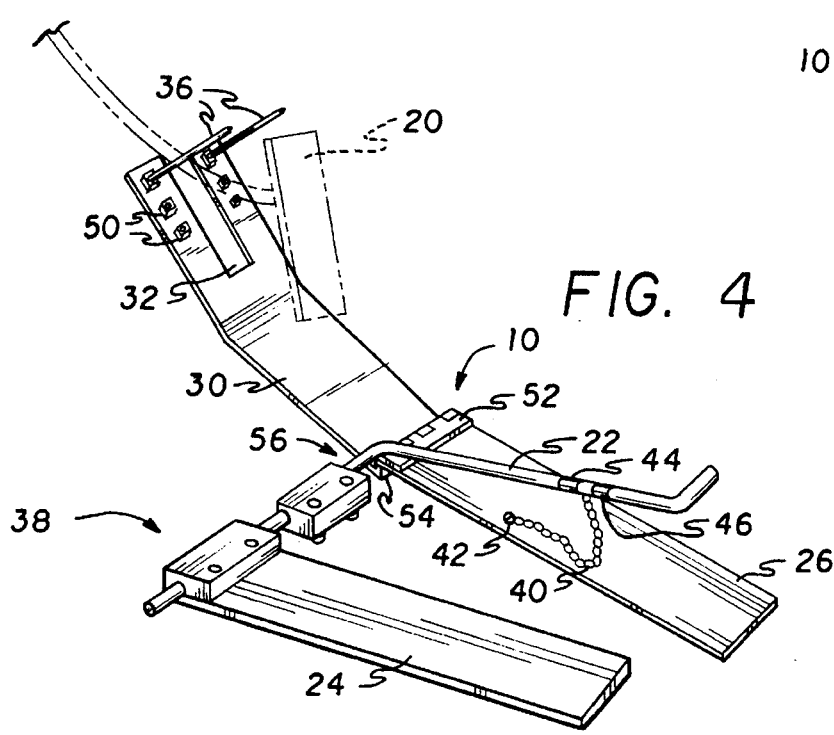

VEHICLE PEDAL COVER FOR USE WITH AN AUXILIARY PEDAL DEVICE

BACKGROUND OF THE INVENTION

1. Field of the Invention

The present invention relates to a cover for a vehicle pedal, such as an accelerator pedal. More particularly this invention relates to a pedal cover for use in conjunction with an auxiliary pedal device. When the auxiliary pedal is utilized, the cover shields the vehicle pedal from contact by all objects other than the auxiliary pedal device.

2. Description of the Prior Art

Apparatuses enabling a driver of a vehicle to use an auxiliary pedal to effect displacement of a pedal of the vehicle are commonly used with accelerator pedals and are commonly called left foot accelerators. These left foot accelerators make it possible for the driver of an automobile to utilize their left leg to control the velocity of the automobile. Various configurations of these left foot accelerators are disclosed in U.S. Pat. No. 3,108,489 issued to Self on Oct. 29, 1963, U.S. Pat. No. 3,199,369 issued to Kaul on Aug. 10, 1965, U.S. Pat. No. 3,224,293 issued to Rose on Dec. 21, 1965, U.S. Pat. No. 3,543,606 issued to Kaul on Dec. 1, 1970, Canadian Pat. No. 490,383 issued to Trevisol on Feb. 10, 1953, French Pat. No. 1,269,300 issued to Seguin on Jul. 3, 1961, and German Published Application No. 1 170 255 to Veigel on May 14, 1964. Common to these left foot accelerators is an arrangement including an arm or shaft having a first end attached to the accelerator pedal and a second end extending in the direction of the driver's side door. Affixed to this second end is an auxiliary pedal for engagement with the driver's left foot. Displacement of this auxiliary pedal results in a corresponding displacement of the accelerator pedal.

Also shown in the prior art are safety devices used in conjunction with left foot accelerators. These safety devices block the automobile accelerator pedal so it cannot be contacted by the feet of the driver. One such device is shown in U.S. Pat. No. 4,587,865 issued to Winner on May 13, 1986 which utilizes an elongated stop member to protect the accelerator pedal. This elongated stop member is detachably affixed to the floor or hump of an automobile and is positioned to extend in front of the accelerator pedal.

A second safety device is shown in U.S. Pat. No. 5,168,771 issued to Fujimori on Dec. 8, 1992. This invention includes a cover member removably secured to a base fastened to the automobile floor. This cover member supports both the main shaft of the left foot accelerator device and a shielding plate which blocks the accelerator pedal. A shielding plate fitting bracket is used to attach the shielding plate to the cover.

None of the above inventions and patents, taken either singly or in combination, is seen to describe the instant invention as claimed.

SUMMARY OF THE INVENTION

The present invention is a vehicle pedal cover for use in conjunction with a device enabling a driver of a vehicle to use an auxiliary pedal to effect displacement of one of the vehicle pedals. One type of auxiliary pedal device is a left foot accelerator device which enables the driver to effect displacement of the accelerator pedal by using his or her left foot to displace an auxiliary pedal. This auxiliary pedal is conveniently located proximate to the driver's left foot and is attached to the accelerator pedal.

The cover of this invention is used in conjunction with auxiliary pedal devices positioned on either side of the vehicle pedal to be covered. It includes an upper plate hingedly secured to a lower plate which engages the vehicle floor. The upper plate covers the vehicle pedal and two shafts, positioned between the plates, limit the rotation of the upper plate toward the vehicle pedal. The predetermined angle between the plates, resulting from this limit of rotation, can be adjusted to permit use of the cover in vehicles of all sizes and shapes. The upper plate may be attached to the auxiliary pedal device so that moving the device into its working position automatically moves the upper plate into its blocking position. Additionally, the upper plate may be rotated out of its blocking position to allow unhindered direct use of the vehicle pedal.

Accordingly, it is a principal object of the invention to provide a novel vehicle pedal cover for preventing displacement of a vehicle pedal resulting from direct contact from either a driver's foot or a prosthetic.

It is another object of the invention to provide a novel vehicle pedal cover which automatically assumes its blocking position upon movement of an auxiliary pedal device into its working position.

It is a further object of the invention to provide a novel vehicle pedal cover which may be quickly and easily moved out of its blocking position to allow uninhibited use of the vehicle pedal.

Another object of the invention is to provide a novel vehicle pedal cover which can be used in vehicles of all sizes and shapes.

Another object of the invention is to provide a novel vehicle pedal cover which can be used to shield vehicle pedals of varying sizes and shapes, regardless of whether the auxiliary pedal device is on the left or right side of the pedal.

Still another object of the invention is to provide a novel vehicle pedal cover which can be used in all vehicles, regardless of whether the driver's side of the vehicle is on either the left or right side.

It is an object of the invention to provide improved elements and arrangements thereof in an apparatus for the purposes described which is inexpensive, simple in construction, dependable and fully effective in accomplishing its intended purposes.

These and other objects of the present invention will become readily apparent upon further review of the following specification and drawings.

BRIEF DESCRIPTION OF THE DRAWINGS

FIG. 1 is a perspective view of the vehicle pedal cover of the present invention showing the blocking position.

FIG. 2 is a top plan view of the vehicle pedal cover of the present invention showing the open position.

FIG. 3 is a front view of the vehicle pedal cover in the blocking position attached to an auxiliary pedal device.

FIG. 4 is a perspective view of the vehicle pedal cover in the open position attached to an auxiliary pedal device.

FIG. 5 is a perspective view of the vehicle pedal cover in the closed position attached to an auxiliary pedal device.

Similar reference characters denote corresponding features consistently throughout the attached drawings.

DETAILED DESCRIPTION OF THE PREFERRED EMBODIMENT

This invention is a vehicle pedal cover for use in conjunction with an auxiliary pedal device. These auxiliary pedal devices are often used by people who have a prosthetic leg and thus may be incapable of depressing the pedal of a vehicle. Auxiliary pedal devices include an auxiliary pedal rotatable between a non-working position, where the auxiliary pedal rests on the floor of the vehicle, and a working position, where the auxiliary pedal is conveniently located for engagement by the driver's non-prosthetic leg. Most auxiliary pedals include an arm extending to the vehicle pedal. When the auxiliary pedal is depressed, the arm exerts force on the vehicle pedal to cause its displacement.

One shortcoming of auxiliary pedal devices is that they do not block the vehicle pedal from contact by objects other than the shaft extending from the auxiliary pedal. This is especially troublesome for people having a right leg prosthesis that may unknowingly engage the accelerator pedal and cause an extremely dangerous situation. To avoid this dangerous situation, people having a right leg prosthesis must often uncomfortably tuck the prosthesis against the seat or rest the prosthesis to the side of the accelerator pedal.

As shown in the figures, the vehicle pedal cover 10 of this invention blocks the vehicle pedal 20 from contact by all objects other than the arm 22 extending from the auxiliary pedal 24. Therefore, danger resulting from inadvertent displacement of the vehicle pedal 20 is eliminated. Additionally, the vehicle pedal cover 10 affords drivers a comfortable sitting position. It acts as a rest for either a tired foot or a prosthesis, which can now be stretched comfortably in front of the driver.

As depicted in FIG. 1, the vehicle pedal cover 10 includes an upper plate 26 having a first end 28 rotatably attached to the lower plate 30. In this figure, the vehicle pedal cover 10 is depicted in its blocking position, where the lower plate 30 is approximately beneath the vehicle pedal 20 and the upper plate 26 is approximately above the vehicle pedal 20. The cavity 32 in the lower plate 30 assures that the lower plate 30 can be positioned beneath the vehicle pedal 20 without hindering the motion of the vehicle pedal 20. The mounting holes 34 are used to secure the lower plate 30 to the floor of the vehicle and the shafts 36 limit rotation of the upper plate 26 to a predetermined angular range.

The open position of the vehicle pedal cover 10 is shown in FIG. 2. Here, the upper plate 26 is rotated so it rests upon the floor of the vehicle. In this position, the upper plate 26 is conveniently situated so as to not hinder operation and use of the vehicle pedal 20.

When the vehicle pedal cover 10 is utilized, the functioning of the auxiliary pedal device 38 is not hindered. As seen in FIG. 3, which shows the vehicle pedal cover 10 in its blocking position, the upper plate 26 protrudes over a portion of the arm 22 extending from the auxiliary pedal 24. Therefore, the upper plate will not interfere with the interaction of the arm 22 and the vehicle pedal 20. When the auxiliary pedal 24 is depressed, the arm 22 acts against the vehicle pedal 20 to effect its displacement.

The vehicle pedal cover 10 includes a chain 40 which connects the upper plate 26 to the arm 22 extending from the auxiliary pedal 24. As most clearly shown in FIG. 4, one end of the chain 40 is connected to a hole 42 in the upper plate 26. Although two holes 42 are shown in the figures, the upper plate 26 could be configured to include any number of holes for selective attachment of the chain 40. To attach the other end of the chain 40 to the arm 22, a first clamp 44 is secured to the arm 22. One link of the chain 40 receives the end of the arm 22 closest to the vehicle pedal 20 and is slid along the arm 22 until it abuts the first clamp 44. A second clamp 46 is then secured to the arm 22 on the side of the chain 40 opposite the first clamp 44. With the clamps, 44 and 46, positioned on both sides of the chain 40, the chain 40 is secured to the arm 22.

The function of the chain 40 is to automatically move the upper plate 26 into its blocking position when the auxiliary pedal 24 is raised to its working position. When the auxiliary pedal 24 is moved to its non-working position, as shown in FIG. 4, the arm 22 extending from the auxiliary pedal 24 rotates the upper plate 26 until the vehicle pedal cover 10 is in its open position. Correspondingly, when the auxiliary pedal 24 is rotated into its working position, the chain 40 rotates the upper plate 26 until it rests on the shafts 36. This is the blocking position which is depicted in FIG. 5. Therefore, movement of the vehicle pedal cover 10 into and out of its blocking position is automatically accomplished upon movement of the auxiliary pedal 24.

A further aspect of the present invention is its flexibility to effectively conform to vehicles having varying sized leg room. First, as shown in FIG. 5, the lower plate 30 is bendable to match the contour of the flooring surface 48 of the vehicle. Second, the vehicle pedal cover 10 includes means to selectively vary the predetermined angular range between the upper and lower plates, 26 and 30 respectively. As depicted in FIGS. 4 and 5, this angular range is dependent upon the positioning of the shafts 36 along the length of the lower plate 30. In the preferred embodiment, the lower plate 30 is provided with a plurality of nuts 50, each for selectively receiving one of the shafts 36. As the positioning of the shafts 36 is moved toward the junction of the upper and lower plates, 26 and 30 respectively, the angle between the plates, 26 and 30, is increased when the vehicle pedal cover 10 is in the blocking position. Therefore, the distance between the plates 26 and 30 may be selectively varied to satisfy the size constraints of the vehicle as well as the comfort requirements of the driver. Additionally, the adjustability of the vehicle pedal cover 10 permits it to be used on any vehicle pedal 20, regardless of whether the auxiliary pedal device 38 is positioned on the right or left side of the vehicle pedal 20.

Along with being sufficiently flexible to conform to cars of different sizes and shapes, the vehicle pedal cover 10 is also sufficiently flexible for use in conjunction with auxiliary pedal devices 38 having diverse shaped extending arms 22. If a portion of the extending arm 22 has a configuration that will engage the vehicle pedal cover 10 at a location proximate to the hinge 52, there must be sufficient clearance for the arm 22 so it will not hinder the movement of the upper plate 26. This clearance is created by the raised portion 54 upon which the hinge 52 is attached to the lower plate 30. As shown in FIG. 1, this raised portion 54 is formed from a bend 56 in the lower plate 30. The clearance for the arm 22 permits the upper plate 26 to rotate until it rests on the shafts 36, as shown in FIGS. 1 and 5.

The vehicle pedal cover 10 of this invention is constructed from an uncomplicated design utilizing as few component parts as necessary. Vehicle floors are saturated with dirt particles which adhere to mechanical parts and obstruct their operation. The uncomplicated design and the use of minimal components help diminish the danger of a break down in operation and make this invention a sturdy and reliable vehicle pedal cover.

It is to be understood that the present invention is not limited to the sole embodiment described above, but encompasses any and all embodiments within the scope of the following claims.

I claim:

1. A pedal cover for use with an auxiliary pedal device, the auxiliary pedal device including an auxiliary pedal and an arm, the arm engaging an accelerator pedal of a vehicle having a floor, the auxiliary pedal being pivotally attached to the floor of the vehicle and being selectively movable between a working position and a non-working position, the arm depressing the accelerator pedal upon displacement of the auxiliary pedal when the auxiliary pedal is in the working position, said pedal cover comprising:

a lower plate having a first end and a second end, said lower plate being adapted for positioning beneath the accelerator pedal;

an upper plate having a first end and a second end, said first end of said upper plate being rotatably attached to said first end of said lower plate, said upper plate being selectively rotatable between a blocking position and an enabling position;

a shaft extending from said second end of said lower plate and contacting said second end of said upper plate when said upper plate is in said blocking position, said shaft preventing rotation of said upper plate toward said lower plate, thereby preventing depression of the accelerator pedal when said upper plate is in said blocking position, said upper plate rotating away from said lower plate and adapted to rest on the floor of the vehicle when in the enabling position, thereby allowing depression of the accelerator pedal; and a chain adapted to connect said upper plate to the arm of the auxiliary pedal device, said chain being positioned to rotate said upper plate into the blocking position when the auxiliary pedal is moved to the working position.

2. The pedal cover according to claim 1, wherein said lower plate has a cavity formed therein for preventing interference between said lower plate and the accelerator pedal of the vehicle.

3. The pedal cover according to claim 1, wherein said shaft limits rotation of said upper plate toward said lower plate through a predetermined angle, said lower plate including a plurality of nuts dimensioned to receive said shaft, whereby positioning said shaft in one of said plurality of nuts selectively varies said predetermined angle.

4. The pedal cover according to claim 1, further including a second shaft extending from said second end of said lower plate and contacting said second end of said upper plate when said upper plate is in said blocking position, said second shaft preventing rotation of said upper plate toward said lower plate.

5. An auxiliary pedal device for use with an accelerator pedal of a vehicle having a floor, said auxiliary pedal device comprising:

a lower plate having a first end and a second end, said lower plate being adapted for positioning beneath the accelerator pedal;

an upper plate having a first end and a second end, said first end of said upper plate being rotatably attached to said first end of said lower plate, said upper plate being selectively rotatable between a blocking position and an enabling position;

a shaft extending from said second end of said lower plate and contacting said second end of said upper plate when said upper plate is in said blocking position, said shaft preventing rotation of said upper plate toward said lower plate, thereby preventing depression of the accelerator pedal when said upper plate is in said blocking position, said upper plate rotating away from said lower plate and adapted to rest on the floor of the vehicle when in the enabling position, thereby allowing depression of the accelerator pedal;

said auxiliary pedal device further comprising an auxiliary pedal and an arm, said arm adapted to engage the accelerator pedal of the vehicle, said auxiliary pedal adapted to be pivotally attached to the floor of the vehicle and being selectively movable between a working position and a non-working position, whereby said arm is adapted to depress the accelerator pedal upon displacement of said auxiliary pedal when said auxiliary pedal is in the working position;

a chain connecting said upper plate to said arm of said auxiliary pedal device, said chain being positioned to rotate said upper plate into the blocking position when said auxiliary pedal is moved to the working position.

6. The auxiliary pedal device according to claim 5, wherein said lower plate has a cavity formed therein for preventing interference between said lower plate and the accelerator pedal of the vehicle.

7. The auxiliary pedal device according to claim 5, wherein said shaft limits rotation of said upper plate toward said lower plate through a predetermined angle, said lower plate including a plurality of nuts dimensioned to receive said shaft, whereby positioning said shaft in one of said plurality of nuts selectively varies said predetermined angle.

8. The auxiliary pedal device according to claim 5, further including a second shaft extending from said second end of said lower plate and contacting said second end of said upper plate when said upper plate is in said blocking position, said second shaft preventing rotation of said upper plate toward said lower plate.

* * * * *